United States Patent
Hetzler et al.

(10) Patent No.: US 7,605,926 B1
(45) Date of Patent: Oct. 20, 2009

(54) OPTICAL SYSTEM, METHOD OF MANUFACTURING AN OPTICAL SYSTEM AND METHOD OF MANUFACTURING AN OPTICAL ELEMENT

(75) Inventors: Jochen Hetzler, Aalen (DE); Ralf Arnold, Aalen (DE); Frank Schillke, Aalen (DE); Bernd Doerband, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 0 days.

(21) Appl. No.: 12/197,035

(22) Filed: Aug. 22, 2008

Related U.S. Application Data

(63) Continuation of application No. 11/233,435, filed on Sep. 21, 2005, now abandoned.

(51) Int. Cl.
*G01B 9/02* (2006.01)
*G01B 11/02* (2006.01)

(52) U.S. Cl. ..................... 356/515; 356/521

(58) Field of Classification Search .............. 356/521, 356/511, 515
See application file for complete search history.

(56) References Cited

U.S. PATENT DOCUMENTS

| | | | |
|---|---|---|---|
| 5,282,016 A | 1/1994 | Shen et al. | |
| 5,530,547 A | 6/1996 | Arnold | |
| 5,737,079 A * | 4/1998 | Burge et al. | 356/513 |
| 5,982,490 A | 11/1999 | Ichikawa et al. | |
| 5,991,035 A | 11/1999 | Bruning | |
| 6,304,325 B1 | 10/2001 | Hardy et al. | |
| 7,061,626 B1 * | 6/2006 | Schillke et al. | 356/513 |
| 7,274,467 B2 * | 9/2007 | Doerband et al. | 356/512 |
| 7,330,267 B1 | 2/2008 | Weitzel | |
| 2006/0274325 A1 * | 12/2006 | Hetzler et al. | 356/521 |
| 2008/0137090 A1 * | 6/2008 | Hetzler et al. | 356/458 |
| 2009/0079992 A1 * | 3/2009 | Doerband | 356/496 |

FOREIGN PATENT DOCUMENTS

| | | |
|---|---|---|
| DE | 198 20 785 A1 | 10/1999 |
| DE | 100 05 170 A1 | 8/2001 |
| DE | 100 05 171 A1 | 8/2001 |
| DE | 102 23 581 A1 | 12/2003 |
| EP | 0 158 172 A2 | 10/1985 |

(Continued)

OTHER PUBLICATIONS

U.S. Appl. No. 10/845,251, filed May 14, 2004, Schillke et al.

(Continued)

*Primary Examiner*—Patrick J Connolly
(74) *Attorney, Agent, or Firm*—Townsend and Townsend and Crew LLP

(57) ABSTRACT

A method of positioning optical elements relative to each other uses an interferometer apparatus comprising a plurality of holograms generating beams of adjustment measuring light which are incident on optical surfaces of the optical elements. Interference patterns generated by superimposing adjustment measuring light of the beams reflected from the surfaces are indicative of positioning errors of the optical elements. The beams of adjustment measuring light may comprise focused beams forming a point focus on the optical surface and beams of light which is orthogonally incident on extended portions on the optical surface.

6 Claims, 10 Drawing Sheets

FOREIGN PATENT DOCUMENTS

| | | |
|---|---|---|
| EP | 0 906 590 B1 | 8/2003 |
| JP | 11-258429 A | 9/1999 |
| JP | 2002-257525 A | 9/2002 |
| WO | WO 2005/114101 A1 | 12/2005 |

OTHER PUBLICATIONS

U.S. Appl. No. 11/035,723, filed Jan. 18, 2005, Doerband.
U.S. Appl. No. 60/689,332, filed Jun. 10, 2005, Schulte.
U.S. Appl. No. 60/645,710, filed Jan. 20, 2005, Hetzler et al.
Leseberg, D., "Position Detection Using ComputerGgenerated Holograms", *SPIE* vol. 1500 Innovative Optics and Phase Conjugate Optics (1991), p. 171.
Poleshchuk, A.G., "Alignment of Diffraction and Refraction Components in Optical Systems", *Avtometriya*, No. 6 (1985), pp. 27-31.
Kim et al., "Null Test for a Highly Paraboloidal Mirror", *Applied Optics*, vol. 43, No. 18 (Jun. 20, 2004), pp. 3614-3618.
Malacara, D., "Optical Shop Testing" $2^{nd}$ Edition, John Wiley & Sons, Inc., (1992), Chapter 12, pp. 427-454.
Burge J., "Computer Generated Holograms for Optical Testing", The University of Arizona, Optical Sciences Course No. 627, Lecture 36 dated Apr. 13, 2005, pp. 1-41.

* cited by examiner

OPTICAL SYSTEM, METHOD OF MANUFACTURING AN OPTICAL SYSTEM AND METHOD OF MANUFACTURING AN OPTICAL ELEMENT

CROSS REFERENCE TO RELATED APPLICATIONS

This application is a Continuation application of U.S. application Ser. No. 11/233,435, filed Sep. 21, 2005, and is incorporated herein in its entirety by reference.

BACKGROUND OF THE INVENTION

1. Field of the Invention

The present invention generally relates to a method of manufacturing an optical system, an optical system and a method of manufacturing an optical element. In particular, the present invention involves obtaining position or shape information using measuring light diffracted at holograms.

2. Brief Description of Related Art

Generally, a performance of an optical system is determined by a quality of its optical components, such as lenses and mirrors, comprised by the system, and by an accuracy of an alignment of the optical components relative to each other.

Typically, the optical elements are made of a glass or other suitable material, and their optical surfaces are processed to have a surface shape corresponding to a specification of the optical system. Herein, it is necessary to compare the shape of the processed optical surface with its target shape according to the design, and to determine differences between the processed actual surface and the target surface. The optical surface may then be further processed at those portions where differences between the actual surface and the target surface exceed e.g. predetermined thresholds.

Thereafter, each of the finished optical elements is attached to a mounting frame made of metal or other suitable material, wherein the mounting frame provides mechanical attachment means, such as flanges, through-holes and others. Thereafter, the optical system is assembled by attaching the respective mounting frames to each other in such a way that positions, such as distances and orientations, of the optical elements relative to each other conform with the specification of the optical system.

Thus, the manufacture of the optical system comprises manufacture of optical elements, manufacture of mounting frames, mounting the optical elements on the respective mounting frames and aligning the mounting frames relative to each other. Especially in the field of photolithography the trend to ever smaller structures of the devices which are to be manufactured places ever higher demands on the quality of the optical imaging systems, and thus on the manufacture of the optical elements and the alignment of the optical elements relative to each other.

SUMMARY OF THE INVENTION

The present invention has been accomplished taking the above problems into consideration.

Embodiments of the present invention provide methods of manufacturing optical elements, methods of positioning optical elements and optical systems.

According to an exemplary embodiment, a method of manufacturing an optical system comprises: mounting a substrate carrying a plurality of gratings adjacent to the first and second optical elements; generating at least one beam of measuring light incident on the plurality of gratings; diffracting the incident measuring light at a first grating to form a first beam of adjustment measuring light which is focused onto an optical surface of the first optical element; diffracting the incident measuring light at a second grating to form a second beam of adjustment measuring light which is orthogonally incident on the optical surface of the first optical element in an extended region thereof; superimposing light of the first beam of adjustment measuring light reflected from the optical surface of the first optical element with reference light to generate at least one first interference pattern; superimposing light of the second beam of adjustment measuring light reflected from the optical surface of the first optical element with reference light to generate at least one second interference pattern; and processing the mounting structure to adjust a position of the first optical element relative to the second optical element based on the at least one first interference pattern and the at least one second interference pattern.

The diffractive gratings may be generated by exposing a suitable material, such as a photographic plate with interfering light beams, or the diffractive gratings may be formed as synthetic holograms, such as computer generated holograms (CGH), generated by simulating an interferometer setup by a suitable computational method, such as ray-tracing, and producing the grating by manufacturing steps using a pen plotter and optical reduction, lithographic steps, laser beam recorders, electron beam recorders, and others.

The first grating is configured such that it produces a focused beam of light from the incident light. According to an exemplary embodiment, the first beam of the adjustment measuring light is focused to form a point focus at a predetermined position relative to the first grating. The first interference pattern generated from the light of the first beam of adjustment measuring light reflected from the optical surface is then indicative of a distance at which the optical surface is positioned from the point focus. It is then possible to adjust the position of the optical element such that the point focus of the first beam of adjustment measuring light substantially coincides with the optical surface.

The second grating is configured to shape the second beam of adjustment measuring light such that it is substantially orthogonally incident on the optical surface of the optical element in an extended region thereof. If the adjustment measuring light of the second beam is exactly orthogonally incident on the optical surface within the extended region, the adjustment measuring light reflected from the optical surface will travel back to the second grating exactly on the same path as it was incident thereon, and the generated second interference pattern will be a desired predetermined pattern. A deviation of the second interference pattern from such predetermined pattern is then indicative of a tilt of the optical surface relative to the second beam of adjustment measuring light. Thus, it is possible to adjust the orientation of the optical element relative to the gratings such that the second interference pattern substantially corresponds to its predetermined pattern.

It is possible to adjust the orientation of the optical element relative to the gratings based on the second interference pattern and to adjust the distance of the optical element from the gratings based on the first interference pattern such that the position of the optical element relative to the gratings may be precisely adjusted in dependence on the first and second interference patterns.

The above illustrated positioning method is used in a manufacture of an optical system comprising first and second optical elements and a mounting structure for supporting the first and second optical elements relative to each other.

The first and second interference patterns are generated from light reflected from the optical surface of the first optical element, and the first optical element may be positioned relative to the gratings based on the first and second interference patterns by processing the mounting structure. The processing of the mounting structure may comprise such as adjusting of rotational positions of screws defining the position of the first optical element relative to the second optical element. If the position of the gratings is already defined relative to the second optical element, the adjustment based on the first and second interference patterns allows to adjust the first and second optical elements relative to each other such that their relative position conforms with a specification of the optical system.

If the position of the gratings relative to the second optical element is not yet precisely defined, the first and second interference patterns may be used to position the gratings relative to the first optical element. Additional gratings can then be used to shape additional beams of adjustment measuring light incident on the optical surface of the second optical element to perform a positioning of the second optical element relative to these gratings and relative to the first optical element to conform with the specification based on an analysis of interference patterns generated from the additional beams of adjustment measuring light.

It is thus possible to adjust the relative position of the first and second optical elements with a high accuracy based on the interferometric measurements. The optical system may comprise additional optical elements which can be positioned relative to the first and second optical elements using the above illustrated method such that a precisely mounted and aligned optical system of three or more optical elements can be manufactured.

According to a further exemplary embodiment of the invention, a method of positioning an optical element comprises: generating light incident on a surface carrying a plurality of gratings; diffracting the incident light at a first grating to form a first beam of adjustment measuring light which is focused onto an optical surface of the optical element at a first position thereon; diffracting the incident light at a second grating to form a second beam of adjustment measuring light which is focused onto the optical surface of the optical element at a second position thereon disposed at a distance from the first position; diffracting the incident light at a third grating to form a third beam of adjustment measuring light focused onto the optical surface of the optical element at a third position thereon disposed at a distance from the first position and the second position; superimposing light of the first beam of adjustment measuring light reflected from the optical surface with reference light to generate at least one first interference pattern; superimposing light of the second beam of adjustment measuring light reflected from the optical surface with reference light to generate at least one second interference pattern; superimposing light of the third beam of adjustment measuring light reflected from the optical surface with reference light to generate at least one third interference pattern; and adjusting a position of the optical element relative to the surface carrying the plurality of gratings based on the at least one first interference pattern, the at least one second interference pattern and the at least one third interference pattern.

The first, second and third gratings are configured such that the first, second and third beams of adjustment measuring light are each focused at predetermined positions at a distance from the gratings. The first, second and third interference patterns generated from the beams of adjustment measuring light reflected from the optical surface are each indicative of distances of the focusing positions from the optical surface. The position of the optical surface relative to the gratings may then be adjusted such that the three focusing positions substantially coincide with the optical surface. Since the three focusing positions are spaced from each other such that they do not lie on a same line, the position of the optical surface relative to the gratings is defined at three locations, and the position of the optical surface is undefined only with respect to rotations.

Also this method may be used in the manufacture of an optical system to precisely adjust relative positions of optical elements of such system.

According to a further exemplary embodiment, the positioning method may be used in the manufacture of optical elements. In such manufacture it is necessary to compare the shape of the optical surface with its target shape, and interferometric apparatuses are commonly used for high-precision shape measurements of optical surfaces. The conventional interferometer apparatus for measuring the shape of an optical surface typically includes a source of sufficiently coherent light and an interferometer optics for generating a beam of shape measuring light which is orthogonally incident on the surface to be tested. An interference pattern generated from the shape measuring light having interacted with the optical surface to be tested is affected both by shape errors of the optical surface and by a positioning error of the optical surface relative to the interferometer optics. The above illustrated positioning method may be used to precisely position the optical surface to be tested relative to the interferometer optics such that shape errors of the optical surface may be derived from the resulting interference pattern generated by the shape measuring light.

The optical surface can be processed based on the interference pattern generated from the shape measuring light such that shape errors of the optical surface are reduced.

According to a further exemplary embodiment, a method of manufacturing a lens comprises: mounting the lens in a beam path of an interferometer apparatus comprising a plurality of gratings; positioning the lens relative to the plurality of gratings; generating at least one beam of light incident on the plurality of gratings; diffracting the incident light at a first grating of the plurality of gratings, to form a first beam of shape measuring light which is incident on an extended portion of a first optical surface of the lens; superimposing light of the first beam of shape measuring light having interacted with the extended portion of the first optical surface with reference light to generate at least one first interference pattern; and diffracting the incident light at a second grating of the plurality of gratings, to form a second beam of measuring light which is incident on a second optical surface of the lens; superimposing light of the second beam of measuring light reflected from the second optical surface of the lens with reference light to generate at least one second interference pattern; and processing the first optical surface of the optical element based on the first interference pattern; and wherein the method further comprises at least one of: processing the first optical surface of the optical element further based on the second interference pattern; and adjusting a position of the lens relative the plurality of gratings based on the second interference pattern.

Interference patterns generated from light having interacted with the first optical surface of the lens and from light reflected from the second surface of the lens can be detected simultaneously to determine a configuration of the first surface relative to the second surface of the lens. Thus, it is not only possible to determine the shape of the first surface but also to determine whether the first surface is correctly positioned relative to the second surface. This method has a particular advantage in manufacturing a lens having one or two aspherical surfaces.

According to an exemplary embodiment herein, the light of the first beam of shape measuring light is substantially orthogonally incident on the extended portion of the first optical surface of the lens such that it is reflected therefrom, diffracted by the first grating again before it is superimposed with the reference light. It is, however, also possible that the first beam of shape measuring light traverses the first optical surface such that it is refracted by the first surface.

Since the light of the first beam interacts with the extended portion of the first optical surface, it is possible to determine a shape of the first surface from the at least one first interference pattern.

The second beam can be focused on the second surface such that it is possible to determine a distance of the second surface from the second grating, and, thus, a distance of the second surface from the first surface, from the at least one second interference pattern.

According to an exemplary embodiment, the light of the second beam interacts with an extended portion of the second optical surface of the lens such that also the shape of a portion of the second optical surface of the lens can be determined simultaneously with the shape of a portion of the first surface of the lens.

According to an exemplary embodiment herein, the first and second gratings are provided within corresponding first and second non-overlapping regions of a grating carrier. With such configuration it is possible to determine shapes of a portion of each of the first and second surfaces at a same time. It is then possible to rotate the lens about an axis of symmetry thereof relative to the gratings such that shapes of other portions of the first and second surfaces can be detected. This process can be repeated for determining shapes of a plurality of portions of each of the first and second surfaces and to combine the shape measurements of the plurality of portions to determine the overall shape of each of the first and second surfaces. Such combining of measurements of portions of a surface is referred to as stitching in the art. Other examples of stitching methods are disclosed in U.S. provisional application Ser. No. 60/689,332 filed on Jun. 10, 2005 and international patent application no. PCT/EP2004/005194 filed on May 14, 2004.

According to an exemplary embodiment herein, the line between the first and second gratings is a curved line such that a periphery of the portions of the first and second surfaces which can be measured at a same time has a greater length as compared to a situation where the first and second gratings are separated by a straight line. The increased length of the periphery of the portion which can be measured at a same time allows for an improved accuracy when the shape of the combined surface is determined by stitching together the individual measurements.

According to further embodiments of the present invention, a method of operating an interferometer system comprises: generating at least one beam of measuring light; directing the at least one beam of measuring light onto a Fizeau surface; forming a focused beam of measuring light by diffracting measuring light of the at least one beam of measuring light having traversed the Fizeau surface at a first grating such that the focused beam of measuring light is focused on a selected optical surface of a group of optical surfaces disposed in a beam path of the at least one beam of measuring light; diffracting measuring light of the focused beam of measuring light reflected from the selected optical surface at a second grating such that the measuring light diffracted at the second grating is directed to the Fizeau surface; superimposing, on a detector, measuring light diffracted at the second grating and having traversed the Fizeau surface thereafter with measuring light of the at least one beam of measuring light reflected from the Fizeau surface; and adjusting an orientation of the Fizeau surface relative to the at least one beam of measuring light based on an interference pattern detected by the detector.

The above method allows to precisely orient the Fizeau surface relative to the incident beam of measuring light. For example, the orientation of the Fizeau surface may be orthogonal to the incident beam of measuring light, or the Fizeau surface may be oriented under a small predetermined angle relative to the incident beam of measuring light. In particular, the method allows to precisely verify and maintain the orientation of the Fizeau surface during an interferometric measurement, and the method, thus, also allows to compensate drifts introduced for example by temperature changes during a long-term interferometric measurement.

Such interferometric measurement may be performed for determining a shape of a surface of an optical element, and the method may then further comprise directing measuring light of the at least one beam of measuring light having traversed the Fizeau surface onto the optical surface and superimposing measuring light reflected from the optical surface and having traversed the Fizeau surface thereafter with measuring light of the at least one beam of measuring light reflected from the Fizeau surface on a second detector portion of the detector system. An embodiment of a method of manufacturing an optical element uses the above illustrated method, and the first optical surface is processed based on a second interference pattern detected by the second detector portion.

The selected optical surface on which the focused beam is focused may be any suitable optical surface disposed in the beam path of the interferometer system. According to an embodiment of the present invention, the focus of the focused beam is formed on the first optical surface of the optical element to be manufactured. According to a further embodiment of the present invention, the focus of the focused beam is formed on a surface of a substrate carrying at least one of the first grating and the second grating.

According to an exemplary embodiment herein, the measuring light directed onto the first optical surface for generating the second interference pattern may be diffracted by a third grating disposed between the Fizeau surface and the first optical surface. Advantageously, the third grating is configured such that wavefronts of the measuring light diffracted by the third grating have a shape which substantially conforms with a shape of the first optical surface when the optical element is disposed at a predetermined measuring position relative to the third grating. In such situation, the measuring light is substantially orthogonally incident on the measured first optical surface at each location thereof. As a result, the measuring light reflected from the first optical surface travels back on a same path as the light which is incident on the first optical surface, and the so-called common path condition of a Fizeau surface is substantially fulfilled. In this context, the word substantially means that the common path condition is fulfilled with an accuracy sufficient for determining deviations of the shape of the first optical surface from a target shape thereof under practical conditions.

According to an exemplary embodiment herein, the measuring light directed onto the first optical surface is further diffracted at a fourth grating disposed between the third grating and the first optical surface.

Further embodiments of the present invention provide a Null lens arrangement for an interferometer, comprising: a front surface providing a Fizeau surface; a back surface fixedly positioned relative to the first surface; a first grating provided on one surface of the front surface and the back surface, wherein the first grating is configured to form a first focused beam of measuring light by diffracting measuring light traversing the Fizeau surface under a predetermined angle, wherein the first focused beam of measuring light forms a focus on the other surface of the front surface and the back surface; a second grating provided on the one surface of the front surface and the back surface, wherein the second grating is configured to form a second focused beam of measuring light by diffracting measuring light traversing the Fizeau surface under the predetermined angle, wherein second focused beam of measuring light forms a focus on the other surface of the front surface and the back surface; and a third grating provided on one of the first surface and the second surface, wherein the third grating is configured to diffract measuring light traversing the Fizeau surface under the predetermined angle such that shapes of wave fronts of the measuring light diffracted by the third grating substantially conform with a shape of a surface of an optical element disposed at a measuring position relative to the null lens arrangement.

When used in an interferometer system, the Null lens arrangement combines the functions of providing the Fizeau surface and of generating a beam of measuring light such that it is substantially orthogonally incident on an optical surface to be tested. The arrangement has an advantage in that an orientation of the Fizeau surface and, at the same time of the grating generating the beam of measuring light incident on the optical surface to be tested, can be precisely oriented relative to a beam of measuring light generated by the interferometer system.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF EXEMPLARY EMBODIMENTS

Figure 1:
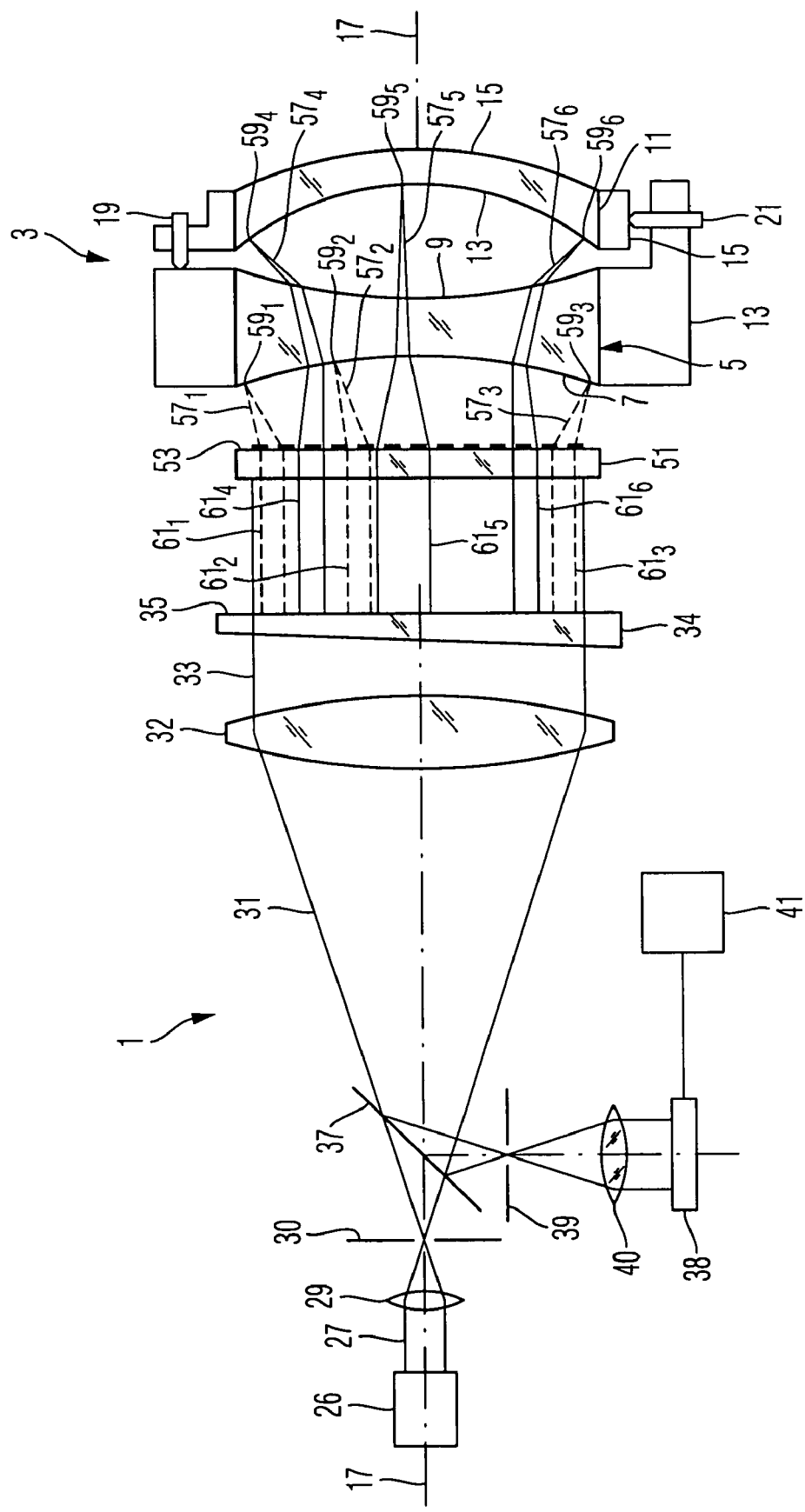
FIG. 1 illustrates an interferometer arrangement for adjusting an optical system.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

FIG. 1 schematically illustrates an interferometer apparatus 1 for testing an optical system 3. The optical system 3 comprises a first lens 5 having a front surface 7 and a back surface 9, and a second lens 11 having a front surface 13 and a back surface 15. The lens 5 is mounted on a frame 13, and the lens 11 is mounted on a frame 15. The lenses 5 and 11 are positioned relative to a common optical axis 17, wherein a relative position of the lenses 5, 11 along the optical axis can be adjusted by three screws 19 traversing threaded axial holes of the frame 15, wherein tip ends of the screws abut against the frame 13 of the lens 5. A distance and orientation of the lens 11 from the lens 5 may be adjusted by adjusting rotational positions of the screws 19. Further, three screws 21 traversing radial threaded through-holes of the frame 13 abut with their radial inner ends against an outer surface of the frame 15 of the lens 11 such that a lateral position of the lens 11 relative to the optical axis may be adjusted by adjusting rotational positions of the screws 21.

It is assumed that the surfaces 7, 9, 13, 15 of lenses 5 and 11 are manufactured according to a specification of the optical system 3. For providing the optical performance of the optical system according to the specification, it is necessary that the relative position of the lenses 5 and 11 fulfils the specification. The interferometer apparatus 1 is used for determining the relative position of lenses 5 and 11.

The interferometer apparatus 1 comprises a light source 26, such as a helium neon laser, for generating a light beam 27. Beam 27 is focused by a focusing lens arrangement 29, such as a micro-objective, onto a pinhole of a spatial filter 30 such that a diverging beam 31 of coherent light originates from the pinhole of the spatial filter 30. Wavefronts in the diverging beam 31 are substantially spherical wavefronts. The diverging beam 38 is collimated by a collimating lens arrangement 32 to form a substantially parallel beam 33 of light having substantially flat wavefronts. The parallel beam 33 traverses a wedge shaped plate 34 having a flat surface 35 which is orthogonally disposed in the beam 33 to form a Fizeau surface of the interferometer apparatus 1. The Fizeau surface 35 is semitransparent and reflects a portion of the intensity of the beam 33 to form a beam of reference light which travels back along the optical axis 17, is collimated by the collimating lens arrangement 32 to form a converging beam which is reflected from a beam splitter 37 disposed in the diverging beam 31, and to be incident on a camera 38 after traversing a spatial filter 39 and a camera optics 40. The camera 38 may be of a CCD type having a plurality of photosensitive pixels for detecting an interference pattern which is output to a controller 41.

A portion of the beam 33 traversing the Fizeau surface 35 is incident on a glass substrate 51 having a surface 53 on which six computer generated holograms are formed.

Figure 2:
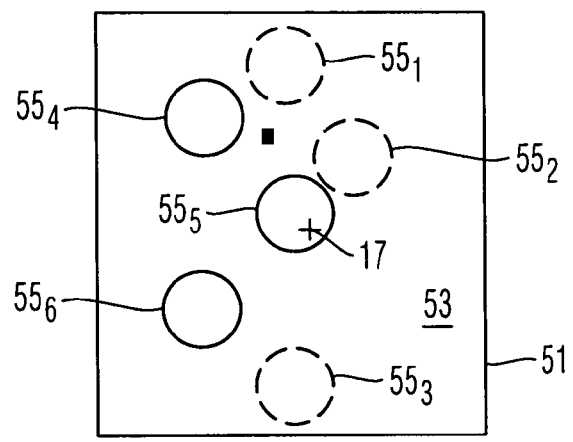
FIG. 2 illustrates an arrangement of plural gratings used in the interferometer arrangement of FIG. 1.

FIG. 2 shows an elevational view on surface 53 of the substrate plate 51. A first hologram $55_1$ has a grating which is designed such that a portion of the beam 33 traversing the hologram 55 is diffracted to form a focused beam $57_1$ of adjustment measuring light. If the optical system 3 is correctly positioned relative to the interferometer apparatus 1, a focusing point $59_1$ of the beam $57_1$ coincides with the optical surface 7 of the optical element 5, and a central ray of the conical focused beam $57_1$ is orthogonally incident on the optical surface 7. The incident beam $57_1$ will then be orthogonally reflected from the optical surface 7 such that the light of the beam $57_1$ travels back to be incident on the grating of the hologram $55_1$ as a diverging beam. The hologram $55_1$ diffracts the incident diverging beam to form a substantially parallel beam $61_1$ of reflected adjustment measuring light which traverses the Fizeau surface 35 where the reflected adjustment measuring light is superimposed with the reference light reflected from the Fizeau surface 35. The reference light and the superimposed adjustment measuring light of the beam $61_1$ form an interference pattern on a portion of the detector 38. This interference pattern can be analyzed by the controller 41. The resulting interference pattern is highly sensitive to a distance of the focusing point $59_1$ of the beam $57_1$ from the optical surface 7. If such distance is detected by the above illustrated method, it is possible to adjust the position of the optical system 3 relative to the interferometer apparatus 1 such that the focusing point $59_1$ of the beam $57_1$ coincides with the optical surface 7.

The surface 53 of the plate 51 carries two further holograms $55_2$ and $55_3$ having gratings such that corresponding beams $57_2$ and $57_3$ are formed from the incident beam 33. Each of the beams $57_2$ and $57_3$ is a focused beam having a corresponding focusing point $59_2$ and $59_3$, respectively. The gratings of the holograms $55_2$ and $55_3$ are designed and manufactured such that the focusing points $59_2$ and $59_3$ coincide with the optical surface 7 if the optical system 3 is correctly positioned relative to the interferometer apparatus 1. Since the three focusing points $59_1$, $59_2$ and $59_3$ are disposed at a distance from each other and not on a common line, the position, i.e. the distance and the orientation, of the optical system 3 relative to the interferometer apparatus 1 is precisely adjusted if the three interference patterns generated from the reflected beams $61_1$, $61_2$ and $61_3$ of adjustment measuring light indicate that the respective focusing points coincide with the optical surface 7.

The surface 53 of substrate 51 carries three additional holograms $55_4$, $55_5$, and $55_6$ which have gratings which diffract the light of incident beam 33 such that three converging beams $57_4$, $57_5$ and $57_6$ of adjustment measuring light are formed. The beams $57_4$, $57_5$ and $57_6$ traverse the lens 55 and have focusing points $59_4$, $59_5$ and $59_6$, respectively which coincide with the optical surface 13 of the lens 11 if the lens 11 is correctly positioned relative to the lens 5 according to the specification of the optical system 3. Further, central rays of the beams $57_4$, $57_5$ and $57_6$ are orthogonally incident on the optical surface 13 such that the corresponding beams of adjustment measuring light reflected from the optical surface 13 traverse the lens 5 again and are incident on the respective holograms $55_4$, $55_5$ and $55_6$ to be diffracted by the gratings of the holograms to form parallel beams $61_4$, $61_5$ and $61_6$ which traverse the Fizeau surface 35 and are superimposed with the reference light reflected from the Fizeau surface 35 to form corresponding interference patterns on respective portions of the detector 38.

The generated interference patterns can be analyzed to determine whether the focusing points $59_4$, $59_5$ and $59_6$ coincide with the optical surface 13 of the lens 11, and the screws 19 and 21 can be manipulated to achieve the relative position of the lenses 11 and 5 such that the focusing points $59_4$, $59_5$ and $59_6$ coincide with the optical surface 13. If such relative positioning is achieved, the lenses 11 and 5 of the optical system 3 are correctly positioned relative to each other.

It is further possible to add a third lens to the optical system 3 and to adjust the position of such third lens relative to the lens 5 or the lens 11 by using the above illustrated method, wherein a further plate having six holograms formed on a surface thereof is used in the interferometer arrangement. These six holograms are designed such that three diffracted beams of adjustment measuring light are focused on an optical surface of the third lens and three beams of adjustment measuring light are focused on one of the optical surfaces of the lenses 5 or 11. Optical systems having many lenses can be assembled and precisely adjusted by this method.

Figure 3:
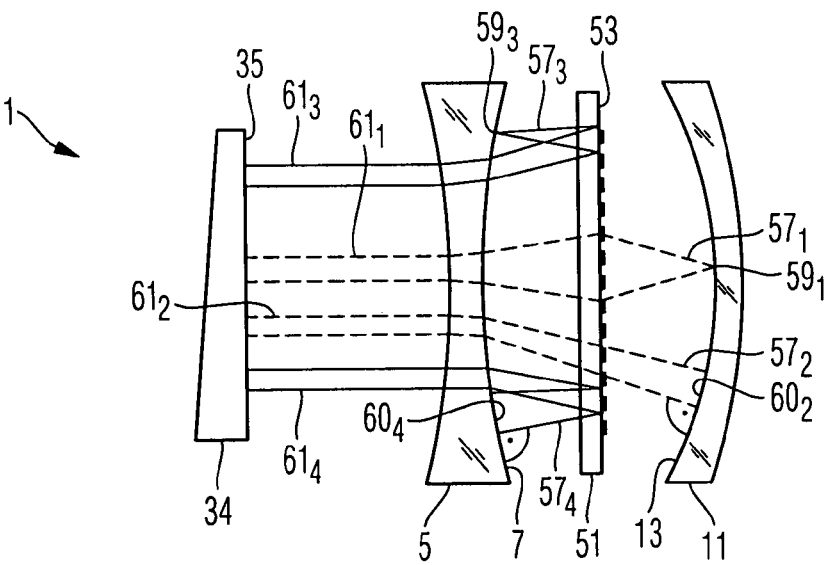
FIG. 3 illustrates a portion of an interferometer arrangement for adjusting positions of optical elements relative to each other.

FIG. 3 illustrates a portion of a further interferometer arrangement which is similar to that shown in FIG. 1. The arrangement shown in FIG. 3 differs from that shown in FIG. 1 in that the substrate 51 carrying plural holograms on a surface 53 thereof is disposed in-between the two lenses 5 and 11. For this purpose, the gratings of the holograms generating beams $57_3$ and $57_4$ of adjustment measuring light incident on a surface 7 of the lens 5 are reflective gratings whereas the gratings of the holograms generating the beams $57_1$ and $57_2$ of adjustment measuring light incident on a surface 13 of lens 11 are transmission gratings.

The arrangement of FIG. 3 differs from the arrangement shown in FIG. 1 by the further aspect that only two beams $57_1$ and $57_2$ are generated for being incident on the surface 13, and only two beams $57_3$ and $57_4$ of adjustment measuring light are generated to be incident on surface 7 of lens 5.

The beam $57_1$ of adjustment measuring light is a focused beam having a focusing point $59_1$ which coincides with the optical surface 13 if the lens 11 is correctly adjusted relative to the interferometer apparatus 1. The interference pattern generated by superimposing the beam $61_1$ of reflected adjustment measuring light is indicative of a distance of the focusing point $59_1$ from the optical surface 13.

The other beam $57_2$ of adjustment measuring light is diffracted by the grating of the hologram such that the light of the beam $57_2$ is orthogonally incident on the optical surface 13 in an extended region $60_2$ thereof. The interference pattern generated by a beam $61_2$ of adjustment measuring light reflected from the extended region $60_2$ is highly indicative of a tilt of the optical surface 13 away from the condition of orthogonal incidence of the adjustment measuring light within the extended region $60_2$. Thus, an orientation of the lens 11 relative to the interferometer apparatus can be precisely determined from such interference pattern. Together with the distance information derived from the interference pattern generated by the reflected beam $61_1$, it is then possible to adjust the position of the lens 11 relative to the interferometer apparatus both with respect to the distance and with respect to the orientation of the lens 11.

Similarly, the beam $57_3$ of adjustment measuring light is a focused beam having a focusing point $59_3$ coinciding with the optical surface 7 for adjusting the distance of the lens 5 from the grating carrying surface 53, and the beam $57_4$ of adjustment measuring light is orthogonally incident on an extended region $60_4$ of optical surface 7 for determining an orientation of the lens 5 relative to the grating carrying surface 53 of the interferometer apparatus 1.

While the embodiment shown in FIG. 3 has gratings for generating one beam of adjustment measuring light which is focused on the surface and one beam which is orthogonally incident within an extended region of the surface for each of surfaces 7 and 13, it is also possible to provide gratings for generating three beams having a point focus on either of surfaces 7 and 13. Moreover, it is possible to provide additional gratings generating beams having a point focus on the surfaces or being orthogonally incident on extended regions of the surfaces. Such additional beams may increase the measuring accuracy.

Figure 4:
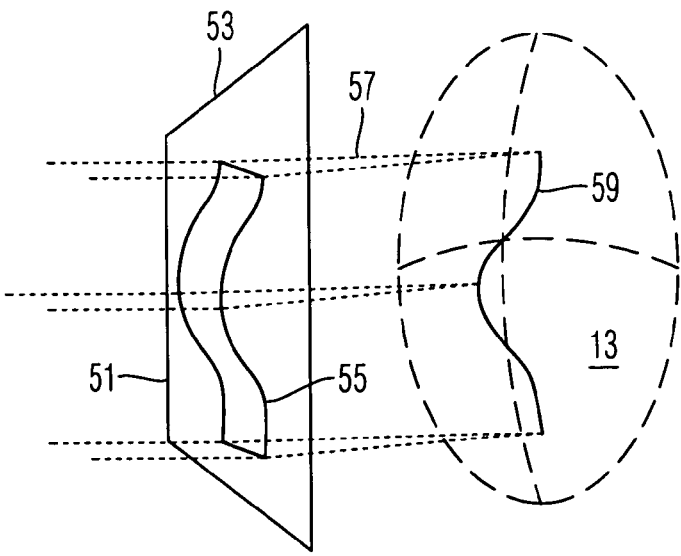
FIG. 4 illustrates a line focus generated by a grating.

FIG. 4 illustrates an embodiment of an interferometer arrangement having a hologram 55 carried on a surface 53 of a substrate 51 wherein the grating of the hologram diffracts an incident beam of light such that a line focus is formed on an optical surface 13. A diffracted beam 57 of adjustment measuring light is focused along a line 59 coinciding with the optical surface 13 if the optical surface 13 is correctly positioned relative to the hologram 55. An interference pattern generated from light reflected from the optical surface 13 and diffracted by the grating of the hologram 55 again is also indicative of a distance of the optical surface 13 from the hologram 55.

Figure 5:
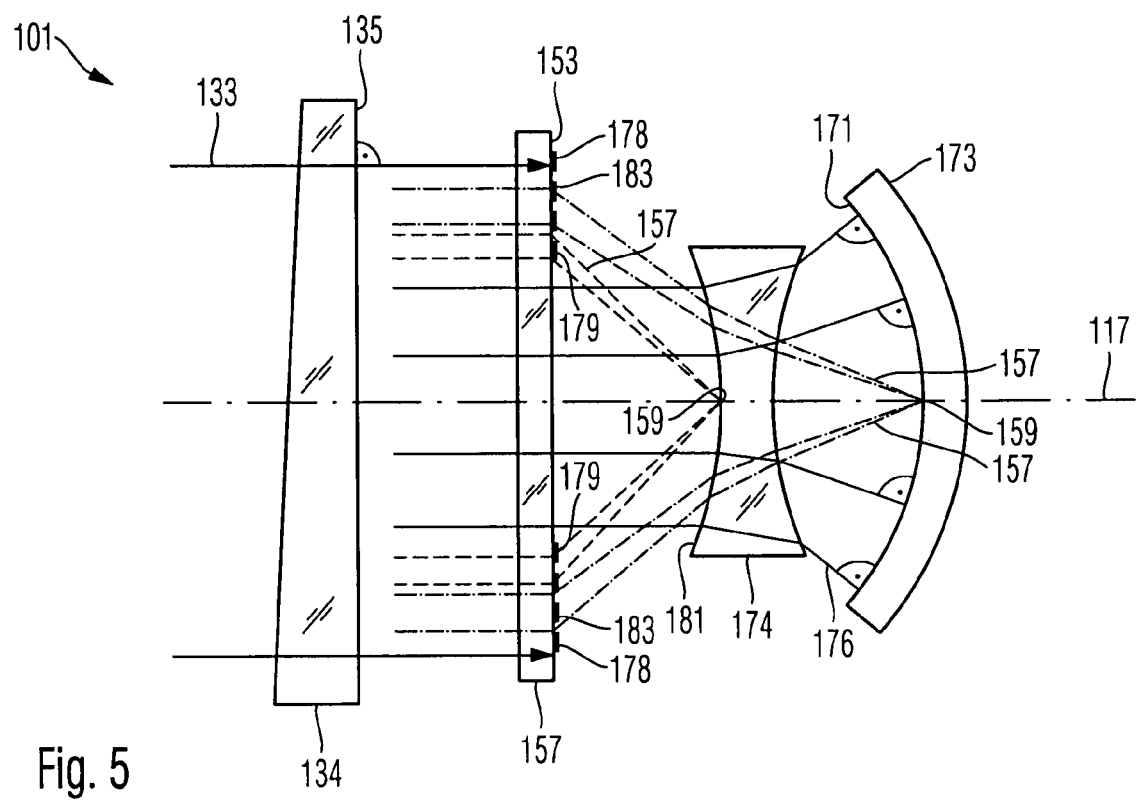
FIG. 5 illustrates an interferometer arrangement used for testing an optical surface.

FIG. 5 illustrates an interferometer apparatus 101 for testing an optical surface 171 of an optical element 173. The optical element 173 may be a lens or a mirror. The interferometer apparatus may have a configuration similar to that shown in FIG. 1 and comprises a light source and optics to generate a beam 133 of measuring light having substantially flat wavefronts traversing a Fizeau surface 135. The optical surface 171 to be tested is an aspherical surface such that the interferometer apparatus 101 comprises an interferometer optics 174 to produce measuring light 176 which is substantially orthogonally incident on the optical surface 171 at each location thereof. Such interferometer optics 174 is also referred to as a compensator or null lens arrangement in the art. Background information relating to such interferometer optics is available e.g. from the text book of Daniel Malacara "Optical Shop Testing", $2^{nd}$ Edition, John Wiley & Sons, Inc. 1992, Chapter 12.

For performing the interferometric test of the optical surface 171 with a high accuracy, it is necessary to position the optical surface 171 relative to the interferometer apparatus 101 with a high accuracy. For this purpose, the interferometer apparatus 101 comprises a transparent substrate 157 carrying a plurality of holograms on a surface 153 thereof: First holograms 178 of a Littrow configuration reflects the incident light 133 to generate an interference pattern on a portion of a detector of the interferometer apparatus 101 which is indicative of a correct positioning of the plate 157 relative to the Fizeau surface 135.

Second holograms 179 diffract the incident light 133 to generate focused beams 157 forming a point focus 159 on a surface 181 of the compensating lens 174. The focused beam 157 generated by one hologram 179 on one side of an optical axis 117 is reflected from the optical surface 181 and is incident on another hologram 179 disposed on the other side of the optical axis to be diffracted to form a parallel beam of reflected adjustment measuring light which is superimposed with reference light reflected from the Fizeau surface 135. The interference patterns formed on portions of the detector are indicative of a distance of the optical surface 181 from the surface 153 carrying the holograms 179. Only one pair of holograms 179 is shown in FIG. 5. It is, however, possible to provide plural pairs of holograms 179 to generate corresponding point foci 159 at plural locations on the optical surface 181 such that both the distance and orientation of the compensating lens 174 can be precisely adjusted relative to the substrate 157.

Similarly, pairs of holograms 183 generate focused beams 157 of adjustment measuring light forming a point focus on the optical surface 171 to be tested. One or plural pairs of focused beams 157 of adjustment measuring light can be generated to be incident as a point focus on the optical surface 171 for adjusting a distance and orientation of the optical surface 171 relative to the compensating lens 174.

Using the adjustment measuring light generated by the holograms 153, 178, 179 and 183, it is possible to correctly align the optical surface 171 relative to the interferometer apparatus before performing the interferometric measurement of the optical surface 171 using the shape measuring light 176. From an analysis of interference patterns generated by superimposing the shape measuring light 176 reflected from the optical surface 171 on a corresponding portion of the detector of the interferometer apparatus 101 it is possible to determine deviations of the surface shape of the optical element 171 from a target shape thereof. The optical element 173 is then processed by a suitable method to reduce shape errors of the optical surface 171 such that it better conforms with its target shape. Such processing may include operations such as milling, grinding, loose abrasive grinding, polishing, ion beam figuring and magneto-rheological figuring. The processed optical element is then mounted in the beam path of the interferometer apparatus 101 and its position is adjusted relative to the interferometer apparatus 101 according to the above illustrated method again, to repeat the interferometric measuring of the surface shape of the optical surface 171 until deviations of the surface shape from its target shape are below predetermined thresholds. Thereafter, a finishing of the optical surface 171 is performed. Such finishing may include a final polishing of the surface 171 or depositing a suitable coating, such as a reflective coating, an anti-reflective coating, and a protective coating applied to the optical surface by suitable methods, such as sputtering. Thereafter, the optical element is assembled with other optical elements to form an optical system of a high quality.

Figure 6:
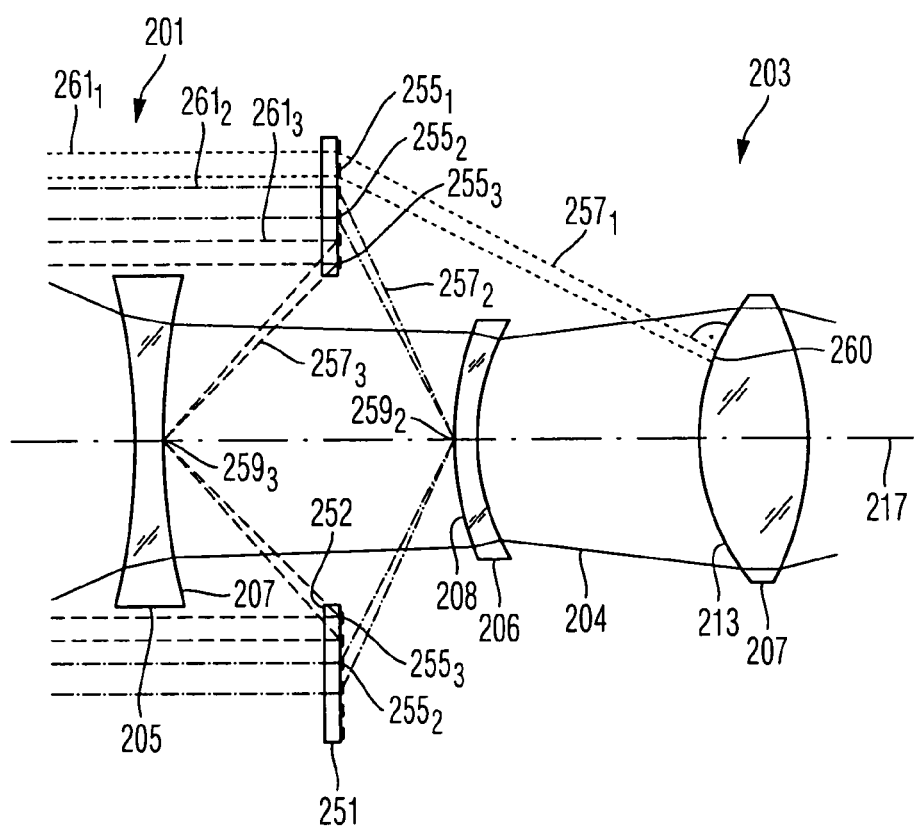
FIG. 6 illustrates an interferometer arrangement used for maintaining relative positions of optical elements of an optical system.

FIG. 6 schematically illustrates a portion of an optical system 203 traversed by a beam 204 of light which is transformed by the optical system 203. The portion of the optical system 203 shown in FIG. 6 comprises three lenses 205, 206 and 207 disposed at distances from each other along an optical axis 217. The lenses 205, 206 and 207 are mounted on frames and mounting structures (not shown in FIG. 6) wherein positions of the lenses 205, 206, 207 relative to each other can be adjusted by actuators, such as piezo-electric actuators, included in the frames and mounting structures. The relative positions of the lenses are controlled by the actuators based on interferometric measurements performed by an interferometer apparatus 201 included in the optical system 203. The interferometer apparatus comprises a substrate 251 carrying holograms $255_1$, $255_2$ and $255_3$. The holograms are disposed outside of a beam path of the operating light 204, and the hologram carrier 251 has a through-hole 252 to allow the beam 204 of operating light to pass therethrough.

The hologram $255_1$ diffracts a beam of incident light to generate a beam $257_1$ of adjustment measuring light which is orthogonally incident on a convex surface 213 of the lens 207 in an extended region 260 of that surface. The light of the beam $255_1$ is orthogonally incident at each location within the extended region 260 such that an orientation of the lens 207 can be determined from an interference pattern generated from the light reflected from the surface 213. Based on an analysis of such interference pattern it is possible to adjust the orientation of the lens 207 by controlling the actuators included in the frame of the lens 207.

Each of a pair of holograms $255_2$ generates focused beams of adjustment measuring light $257_2$ forming a point focus $259_2$ on a surface 208 of the lens 206. The adjustment measuring light reflected from the surface 208 is incident on the other hologram $255_2$ and diffracted to form a beam $261_2$ which is superimposed with reference light in the interferometer apparatus to generate an interference pattern which is indicative of a position of the lens 206 along the optical axis 217. Actuators included in the frame and mounting structures of the lens 206 can then be actuated to adjust the position of the lens 206 to conform with a desired position. Similarly, holograms $255_3$ generate converging beams $257_3$ of adjustment measuring light forming a point focus $259_3$ on a surface 207 of the lens 205. The adjustment measuring light reflected from the surface 207 is again diffracted by one of the holograms $255_3$ to generate a parallel beam $261_3$ of measuring light which is superimposed with reference light to form an interference pattern on a portion of the detector of the interferometer apparatus 201 which is indicative of a position of the lens 205. Again, actuators of the optical system 203 may be controlled such that the position of the lens 205 is adjusted based on the analysis of the interference pattern.

Figure 7:
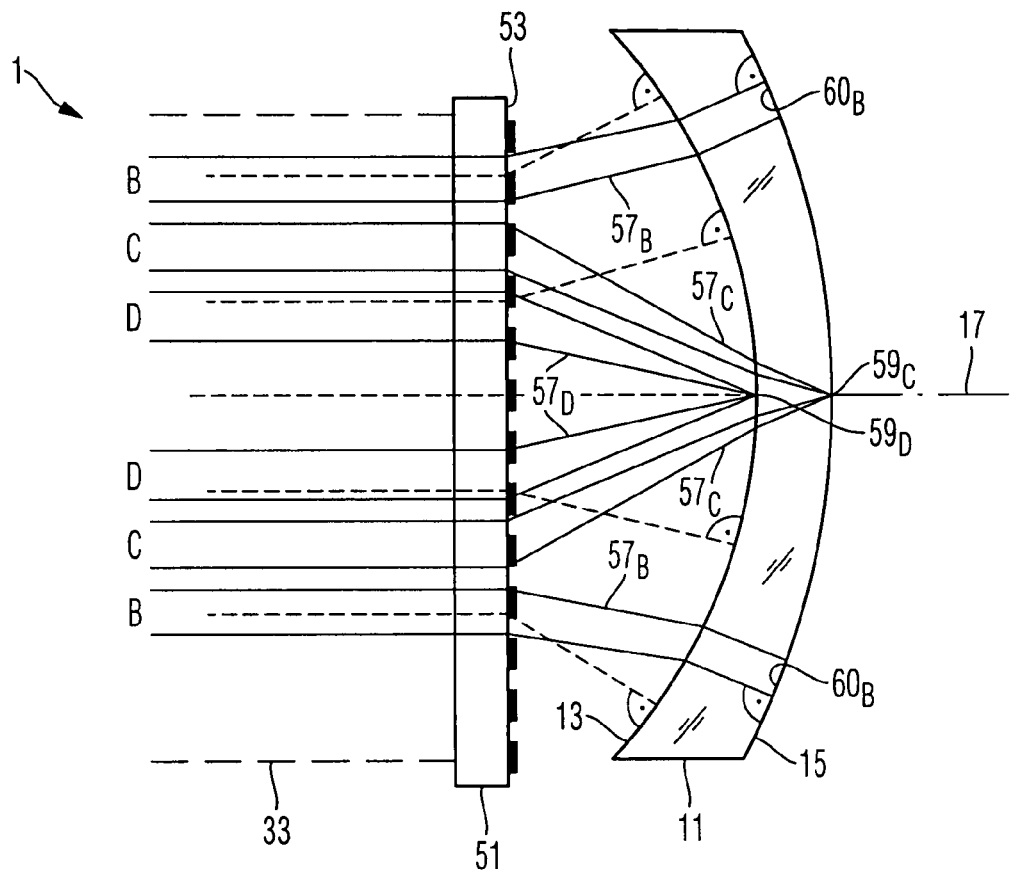
FIG. 7 illustrates a portion of an interferometer arrangement for testing a lens.

FIG. 7 illustrates a portion of an interferometer arrangement 1 for testing a lens 11 having optical surfaces 13 and 15. The interferometer arrangement has a configuration similar to that shown in FIG. 1, and a beam 33 of light having traversed a Fizeau surface (not shown in FIG. 7) is incident on a substrate 51 carrying plural holograms on a surface 53 thereof.

Figure 8:
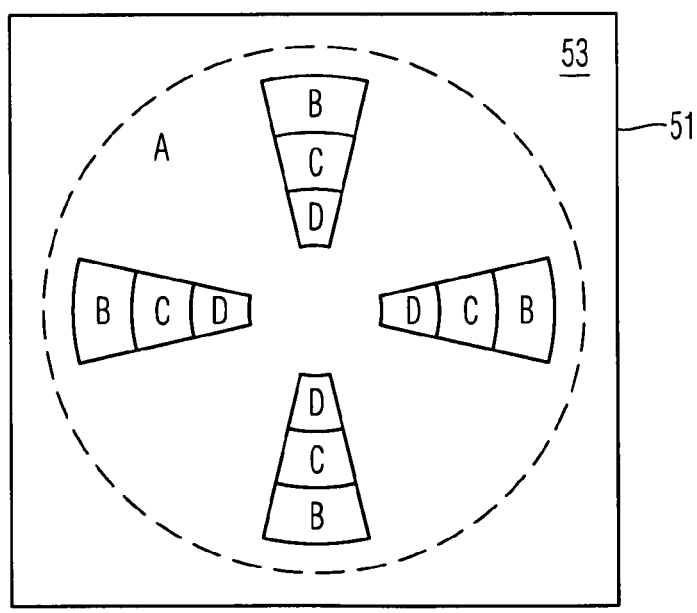
FIG. 8 illustrates an arrangement of plural gratings used in the interferometer arrangement of FIG. 7.

FIG. 8 is an elevational view on surface 53 of the substrate 51. From FIG. 8 it is apparent that plural types A, B, C, D of holograms are formed on the surface 53. For the purposes of this embodiment it can be assumed that surface 15 of the lens 11 is already manufactured to have a predetermined shape, whereas surface 13 has deviations from its predetermined shape. These deviations can be determined with the illustrated interferometer arrangement as follows:

Holograms C diffract the incident light to form beams 57C focused on the surface 15 of the lens 11 at a focusing point 59C. From an interference pattern generated with the light of the beams 57C reflected from the surface 15 it is possible to determine whether the focusing point 59C coincides with the surface 15.

The holograms B diffract the incident light 33 to form beams 57B which are substantially orthogonally incident on extended regions 60B of the surface 15. By comparing interference patterns generated from the measuring light reflected from the extended regions 60B with predetermined patterns, it is possible to determine whether the condition of the substantially orthogonal incidence is fulfilled.

The position of the lens 11 can be adjusted based on an evaluation of the interference patterns generated from the beams 57C and 57B such that both the distance of the lens 11 from the substrate 51 and the orientation of the lens 11 relative to the substrate 51 conform with a predetermined position and orientation.

Thereafter, interferograms generated from light diffracted by holograms A and D are evaluated to determine shape errors of the optical surface 13 of the lens 11. Holograms D diffract the incident light 33 to form focused beams 57D which have a focusing point 59D. The focusing point 59D is disposed at a predetermined distance from the focusing point 59C. By evaluating the interference patterns generated from the light of the beams 57D, it is possible to determine whether the focusing point 59D coincides with the surface 13. It is thus possible to determine whether the lens 11 has a predetermined thickness on an axis 17 of rotational symmetry of the lens 11. The surface 13 can be processed thereafter to reduce the thickness of lens 11 such that it conforms with the predetermined thickness.

The hologram A diffracts the incident light 33 such that it is substantially orthogonally incident on the surface 13 of the lens 11. Shape errors of the surface 13 can be determined from the interference pattern generated with the light reflected from the surface 13. By comparing the measured shape of the surface 13 with its predetermined shape, it is possible to determine deviations of the shape of the surface 13 from its predetermined shape, and a subsequent processing of the surface 13 will be performed to reduce such deviations. With the illustrated method it is not only possible to manufacture the surface 13 such that it conforms with its predetermined shape, it is also possible to manufacture the surface 13 such that its position and orientation relative to the other surface 15 of the lens 11 conform with a predetermined position and orientation.

From FIG. 8 it is apparent that the hologram A for determining the shape of the surface 13 is provided in a region of the surface 53 of the substrate 51 outside of regions occupied by the holograms B, C and D. Thus, it is not possible to determine the overall shape of the surface 13 by one single measurement. The lens 11 is mounted relative to the substrate 51 on a frame rotatable about the optical axis 17 of the lens 11, and plural interferometric measurements of the surface 13 are performed at plural respective rotational positions of the lens about the optical axis 17. The individual measurements are combined by a stitching method to determine the overall shape of the surface 13.

Figure 9:
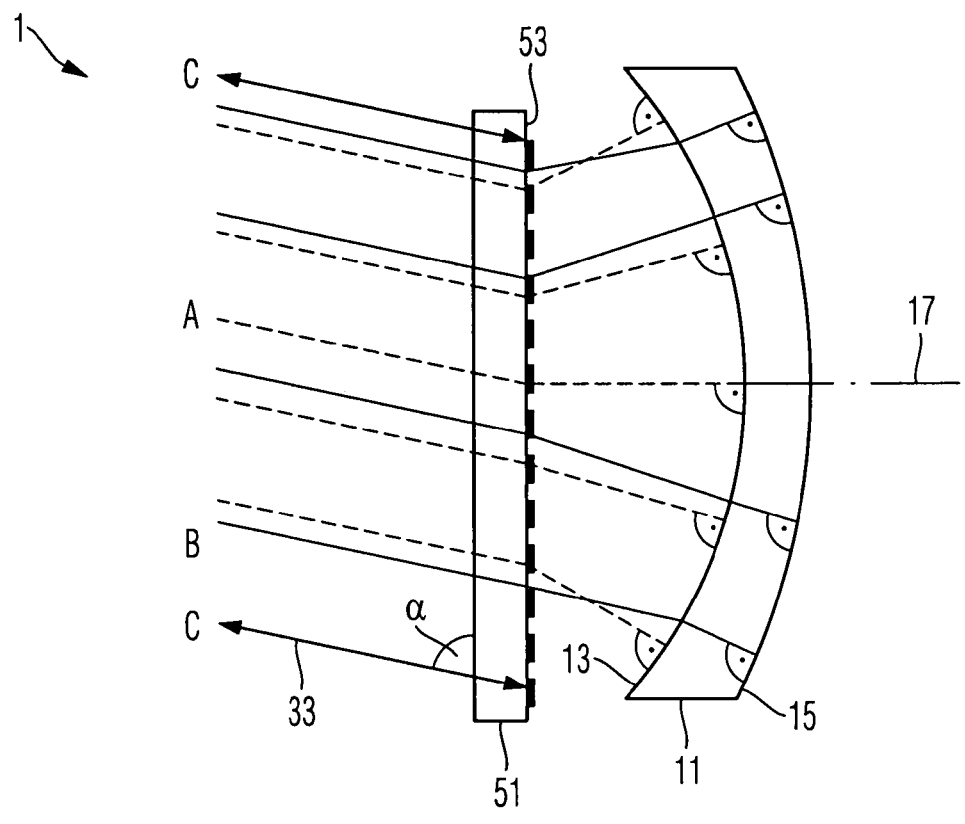
FIG. 9 illustrates a portion of a further interferometer arrangement for testing a lens.

FIG. 9 illustrates a portion of an interferometer arrangement 1 for simultaneously testing a front surface 13 and a back surface 15 of a lens 11. The arrangement shown in FIG. 9 is similar to that shown in FIG. 7, wherein a beam 33 of measuring light is incident on a plurality of holograms provided on a surface 53 of a substrate 51, wherein a Fizeau surface and further elements of the interferometer apparatus are not shown in FIG. 9. These elements can be embodied as illustrated in FIG. 1.

Figure 10:
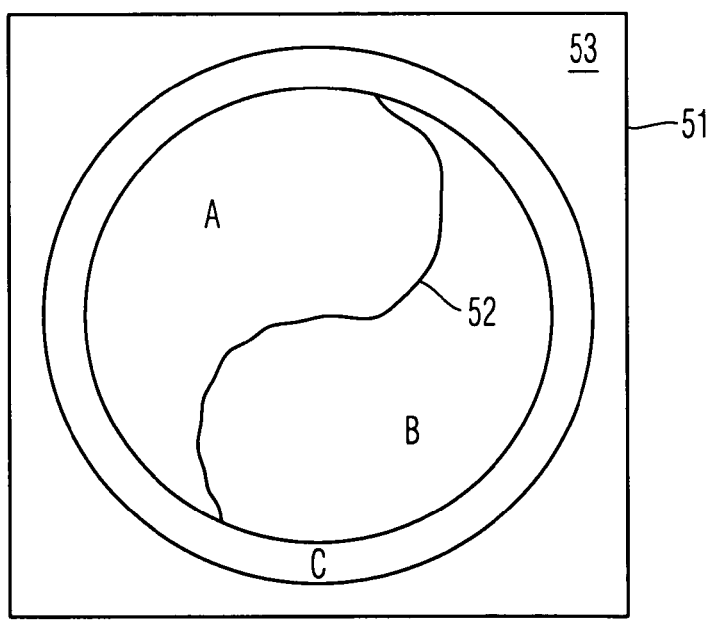
FIG. 10 illustrates an arrangement of plural gratings used in the interferometer arrangement of FIG. 9.

FIG. 10 shows an elevational view on the surface 53 of the substrate 51. The surface 53 carries a hologram A which diffracts the incident light 33 such it is substantially orthogonally incident on a portion of the front surface 13 of the lens 11. By evaluating an interference pattern generated from the light reflected from the front surface 13 it is possible to determine a shape of that portion of the front surface 13. A hologram B diffracts the incident light 33 such that it is substantially orthogonally incident on a portion of the back surface 15 of the lens 11. By evaluating an interference pattern generated from light reflected from the back surface 15 it is possible to determine a shape of that portion of the back surface. Thus, the arrangement allows to simultaneously determine shapes of both the front surface and the back surface of the lens 11. Since the holograms A and B are provided in different regions of the surface 53 of the substrate 51, it will be necessary to perform individual measurements at plural rotational positions of the lens 11 about its optical axis 17 and to determine the overall shapes of the surfaces 13 and 15 by a stitching method.

A separating line 52 between the regions on the surface 53 of the substrate 51 providing the holograms A and B is a curved line which has a greater length as compared to a situation where the holograms A and B were separated by a straight line. Such increased length of the separating line 52 results in an improved accuracy for determining the overall shapes of the surfaces 13 and 15 by the stitching method.

The interferometer arrangement 1 shown in FIG. 9 differs from the interferometer arrangements shown in the FIGS. 1, 3 and 7 in that the incident light 33 is incident on the substrate 51 under an angle α which is different from 90°. Thus, also light which is orthogonally incident on the surface 13 in a region of the optical axis 17 is diffracted by the respective hologram A or B by the angle α. Compared to the holograms of the previous embodiments illustrated in FIGS. 1, 3 and 7, the holograms of the present embodiments have an increased line density and are also referred to as carrier frequency holograms in the art.

A hologram C provided on a ring-shaped region of the surface 53 of the substrate 51 has a Littrow configuration and reflects the incident light 33 back exactly on a same path as it was incident on the hologram C. An interference pattern generated from the light reflected from the hologram C can be evaluated to determine and adjust the orientation of the substrate 51 relative to the incident light 33 to conform with a predetermined orientation α.

Figure 11:
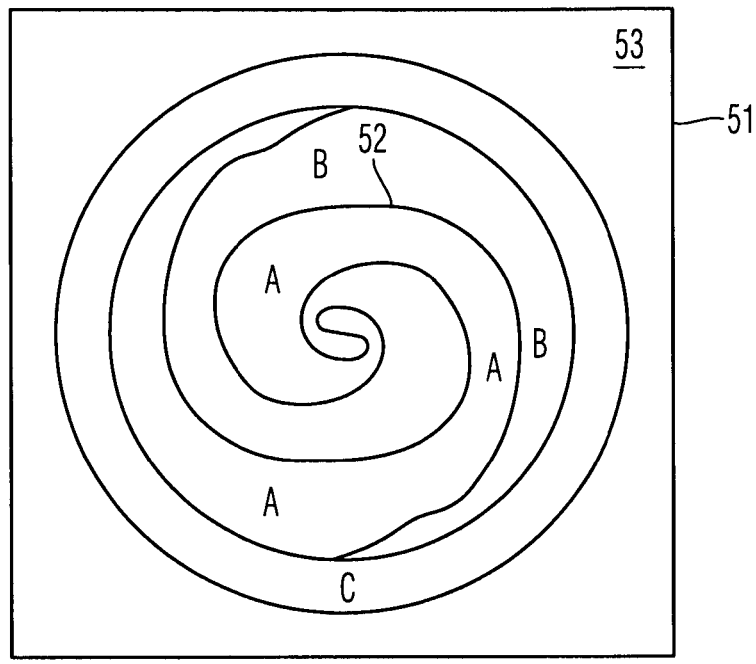
FIG. 11 illustrates a further arrangement of plural gratings which may be used in the interferometer arrangement of FIG. 9.

FIG. 11 is an elevational view on a surface 53 of a substrate 51 according to a further embodiment of the present invention. The surface 53 provides holograms A and B for a simultaneous testing of a front surface and a back surface of a lens in a method similar to that illustrated with reference to FIGS. 9 and 10.

The holograms A and B of FIG. 11 differ from those shown in FIG. 10 in that a separating line 52 between the holograms A and B has a spiral shape and a length which is significantly greater than the length of the separating line of FIG. 10. Such greater length of the separating line further improves the accuracy of the determined shapes of the overall back and front surfaces of the lens.

Figure 12:
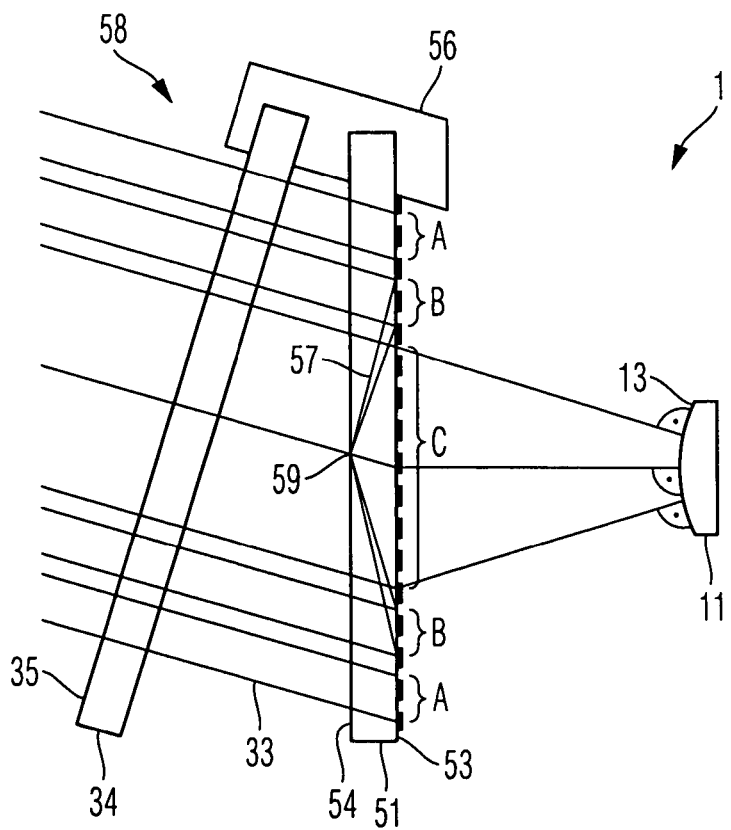
FIG. 12 illustrates a further interferometer arrangement used for testing an optical surface.

FIG. 12 illustrates a portion of an interferometer arrangement 1 for testing an optical surface 13 of an optical element 11. The interferometer arrangement comprises a Null lens arrangement 58 comprising a glass substrate 34 having a front surface providing a Fizeau surface 35 of the interferometer arrangement, and a glass substrate 51 having a back surface 53 carrying plural holograms. The substrates 34 and 51 are fixedly mounted relative to each other by a mounting structure 56.

A grating or hologram A provided on a ring-shaped portion of the back surface 53 has a Littrow configuration and is configured such that measuring light 33 having substantially orthogonally traversed the Fizeau surface 35 is reflected such that the reflected light travels back on a same beam path as it was incident on the grating A. An interference pattern generated from the measuring light reflected by grating A and superimposed with measuring light reflected from the Fizeau surface 35 is used for a first adjustment of an orientation of the Null lens arrangement 58 relative to the incident beam of measuring light 33.

A further hologram or grating B is provided on a ring-shaped portion of the back surface 53. The grating B is configured such that measuring light incident on the grating B in an upper portion of FIG. 12 is reflected as a focused beam 57 having a focus 59 coinciding with a surface 54 of substrate 51. The focused beam 57 reflected from the surface 54 at the focus point 59 is diffracted by the grating B in the lower portion of FIG. 12 such that the diffracted light is directed to the Fizeau surface 35 as a parallel beam substantially orthogonal to the Fizeau surface 35. A portion of this parallel beam having traversed the Fizeau surface 35 is superimposed with measuring light reflected from the Fizeau surface 35 and generates an interference pattern on a portion of a detector of the interferometer arrangement 1. This interference pattern is highly indicative of an orientation of the Fizeau surface 35 relative to the beam 33 of incident measuring light. Based on an analysis of this interference pattern it is possible to accurately adjust the orientation of the Null lens arrangement 58 relative to the incident beam 33.

Thereafter, a shape measurement of the surface 13 is performed with measuring light having traversed the Fizeau surface and being diffracted by a hologram C provided in a central portion of surface 53 of substrate 51. Hologram C has a function of a Null lens and diffracts the beam 33 of measuring light such that wavefronts of the measuring light incident on the surface 13 have a shape which substantially corresponds to a target shape of the surface 13 of the optical element 11. In such situation, the measuring light is substantially orthogonally incident on the surface 13 at each location thereof. The measuring light is reflected from surface 13 and travels back substantially the same path through the interferometer arrangement as it traveled before it was incident on the surface 13. The measuring light reflected from the surface 13 traverses the hologram C and is diffracted by the hologram C to form a substantially parallel beam which traverses the Fizeau surface 35 and is superimposed with measuring light reflected from the Fizeau surface 35 on a portion of the detector of the interferometer arrangement. An interference pattern formed on that portion of the detector can be analyzed to determine deviations of the shape of the optical surface 13 from its target shape. A processing of the optical surface 13 is performed based on such determined shape differences.

Figure 13:
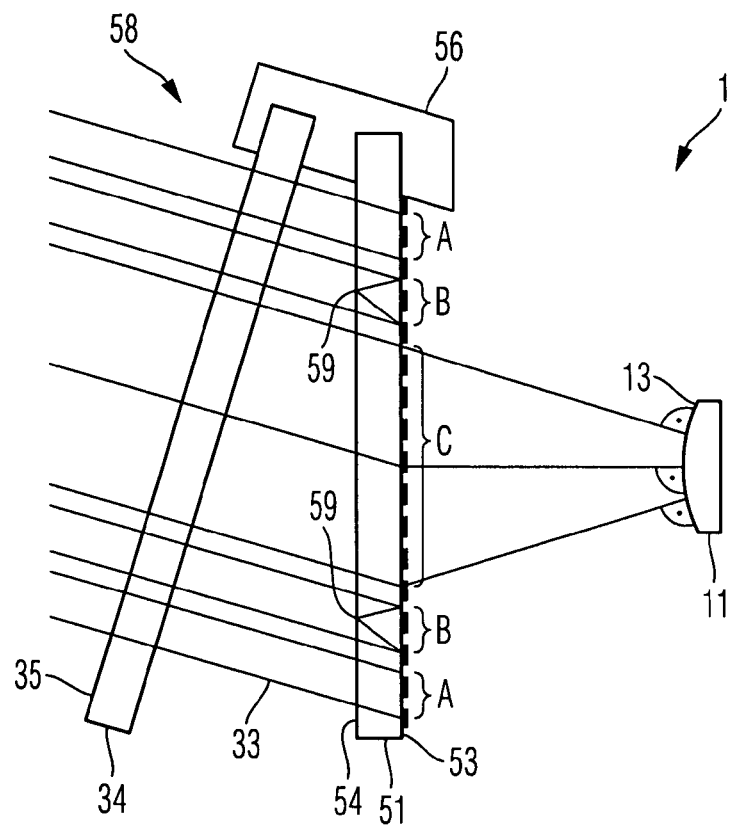
FIG. 13 illustrates a further interferometer arrangement used for testing an optical surface.

FIG. 13 illustrates a portion of an interferometer arrangement 1 for testing an optical surface 13 of an optical element 11. The arrangement shown in FIG. 13 is similar to that shown in FIG. 12 and differs from the embodiment shown in FIG. 12 in the configuration of a hologram B used for generating a focus 59 on a surface 54 of a substrate 51 carrying the hologram B. The hologram B is configured such that a portion of the beam 33 of measuring light incident on the hologram B is reflected as a focused beam generating a focus 59 on the surface 54 in a region within a cross section of the beam portion diffracted by hologram B. The focused beam is reflected from the surface 54 at the focus 59 and travels back on itself to be again diffracted by the hologram B such that it is reflected from the hologram B as a parallel beam directed to and traversing the Fizeau surface 35. An interference pattern generated from this light traversing the Fizeau surface 35 and superimposed with measuring light reflected from the Fizeau surface 35 is again highly indicative of an orientation of the Fizeau surface 35 relative to the incident beam 33 of measuring light. By analyzing such interference pattern it is possible to adjust the orientation of the Null lens arrangement 58 including the Fizeau surface 35 with a high accuracy.

The hologram B may be configured as a continuous hologram provided in a ring-shaped portion of the surface 53 of the substrate 51 such that the focus 59 is a line focus extending as a circular line on the surface 54. As an alternative, plural individual holograms B can be formed on the surface 53 such that each of the plural holograms B generates a point focus 59 on the surface 54.

Figure 14:
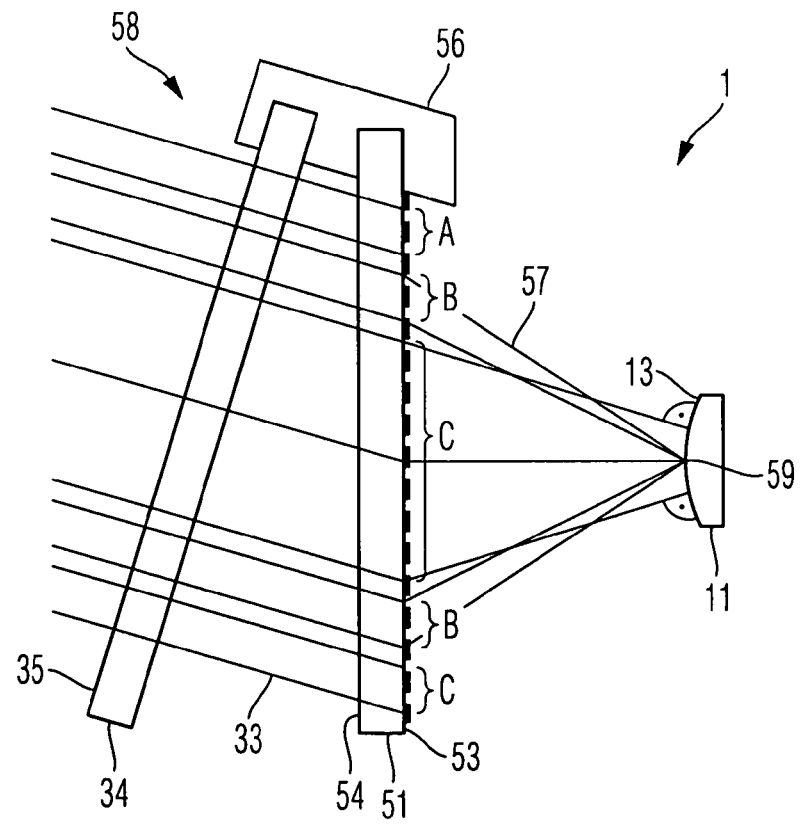
FIG. 14 illustrates a further interferometer arrangement used for testing an optical surface.

FIG. 14 illustrates a portion of an interferometer arrangement 1 for testing an optical surface 13 of an optical element 11. The embodiment shown in FIG. 14 has a configuration similar to that shown in FIG. 12 and differs therefrom in that a grating B forms a focused beam 57 of measuring light having a point focus 59 coinciding with the optical surface 13. An interference pattern generated from measuring light of the focused beam 57 and reflected from the optical surface 13 superimposed with measuring light reflected from a Fizeau surface 35 is indicative of an orientation of the Fizeau surface 35 relative to the incident beam 33 of measuring light and can be used for precisely orienting the Null lens arrangement 58 relative to the incident beam 33 of measuring light.

Figure 15:
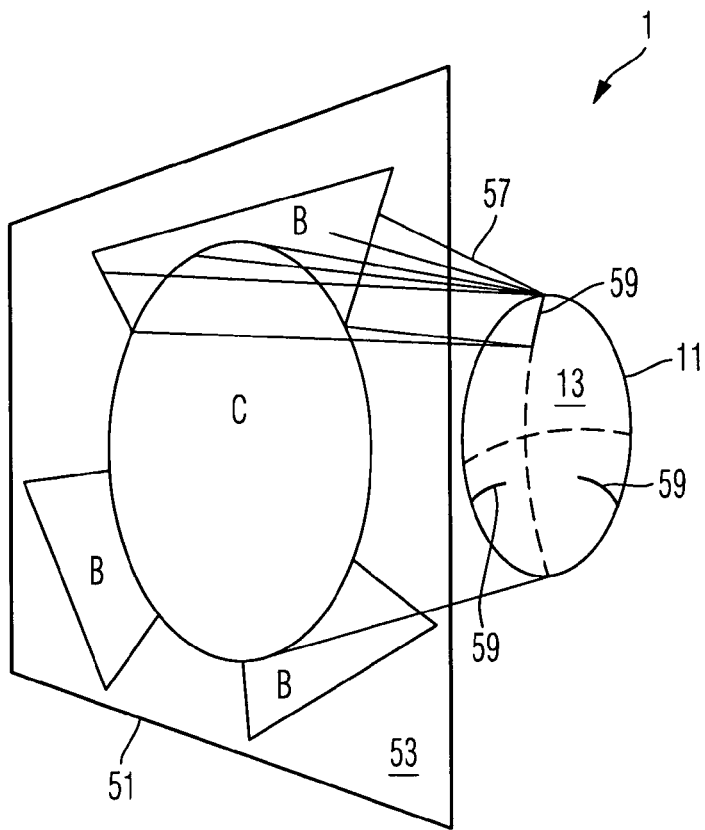
FIG. 15 illustrates a further interferometer arrangement used for testing an optical surface.

FIG. 15 is a perspective illustration of a portion of an interferometer arrangement 1 similar to that shown in FIG. 14. A hologram C provided on the surface 53 of a substrate 51 generates measuring light which is substantially orthogonally incident on a surface 13 to be tested. Each of holograms B diffracts incident measuring light to form a focused beam 57 having a line focus 59 coinciding with the optical surface 13 of the optical element 11. Interference patterns generated from measuring light of the beams 57 reflected from the optical surface 13 are both indicative of an orientation of a Fizeau surface (not shown in FIG. 15) of the interferometer arrangement 1 relative to the incident beam of measuring light, and they are also indicative of a correct positioning of the optical element 11 relative to the holograms B, C such that line foci 59 coincide with the optical surface 13. Both the orientation of the Fizeau surface relative to the incident beam of measuring light and the position of the optical element 11 relative to the holograms B and C can be adjusted in dependence of an analysis of such interference patterns.

Figure 16:
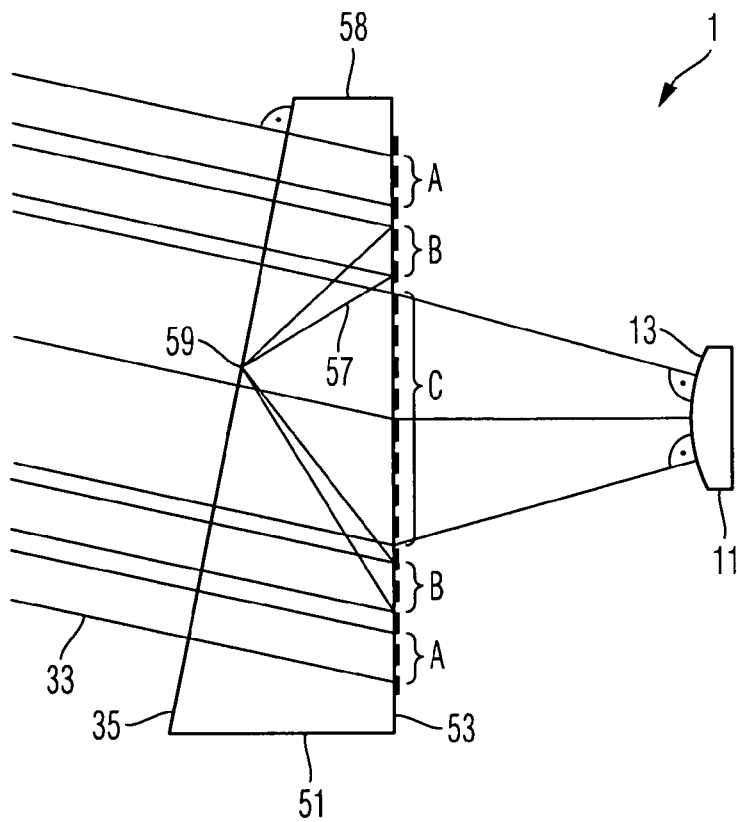
FIG. 16 illustrates a further interferometer arrangement used for testing an optical surface.

FIG. 16 illustrates a portion of an interferometer arrangement 1 for testing a surface 13 of an optical element 11. The configuration of the arrangement 1 of FIG. 16 is similar to that shown in FIG. 12 and differs therefrom in that a Null lens arrangement 58 providing a Fizeau surface 35 and a surface 53 carrying plural holograms A, B, C are provided on a same wedge-shaped substrate 51.

The hologram B diffracts incident measuring light such that a focused beam 57 has a focus 59 coinciding with the Fizeau surface 35. Measuring light of the focused beam 57 at the Fizeau surface 35 is again diffracted by hologram B and generates an interference pattern used for precisely orienting the Fizeau surface 35 and therefore the substrate 51 relative to the incident beam 33 of measuring light.

The hologram A is of a Littrow configuration and reflects incident measuring light for generating an interference pattern. The analysis of this interference pattern and the interference pattern of hologram B can be used for two different purposes. The first purpose is to correct the wedge angle of substrate 51 to allow a precise Littrow condition of hologram A such that the incident measuring light on hologram C fits precisely to the desired design value of the incident measuring light. The second purpose is to detect an error in an angle of incidence of the incident measuring light relative to the precise Littrow condition and therefore to the desired design value of the incident measuring light on hologram C. With this information it is possible to correct numerically the measured surface profile of the test surface 13.

The hologram C diffracts the incident measuring light such that it is orthogonally incident on the optical surface 13 of the optical element. An interference pattern generated from measuring light reflected from the optical surface 13 is used for determining deviations of a shape of the surface 13 from a target shape thereof.

Figure 17:
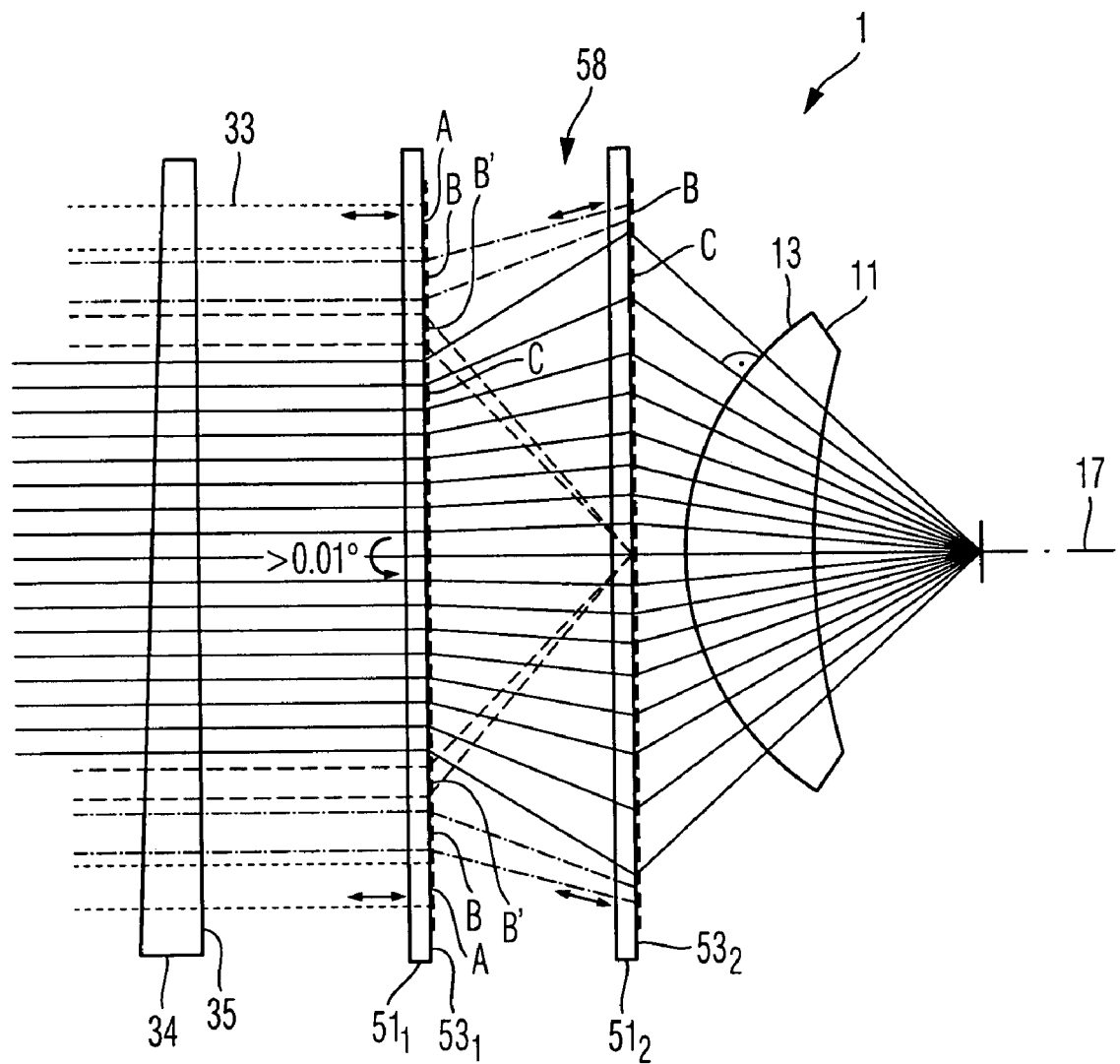
FIG. 17 illustrates a further interferometer arrangement used for testing an optical surface.

FIG. 17 illustrates a portion of an interferometer arrangement 1 for testing a spherical surface 13 of an optical element 11. The interferometer arrangement 1 comprises a Fizeau surface 35 provided on a substrate 34, and a first substrate $51_1$ and a second substrate $51_2$, each carrying plural holograms. A hologram A provided on the first substrate $51_1$ has a Littrow configuration and is used for generating an interference pattern indicative of an orientation of the first substrate $51_1$ relative to the Fizeau surface. A hologram B provided on the first substrate $51_1$ diffracts the incident measuring light such that it is incident on a hologram B provided on the second substrate $51_2$. The hologram B on the second substrate $51_2$ is of a Littrow configuration to reflect the incident light in itself such that it travels back to be diffracted by hologram B of substrate $51_1$. The measuring light diffracted by the hologram B of substrate $51_1$ and hologram B of substrate $51_2$ is used to generate an interference pattern indicative of a relative orientation of the substrates $51_1$ and $51_2$. The orientation of the substrates $51_1$ and $51_2$ is adjusted in dependence of an analysis of these interference patterns.

A hologram B' provided on the first substrate $51_1$ generates a focused beam of measuring light having a point focus on the surface $53_2$ of the second substrate $51_2$. Measuring light of this focused beam reflected from the surface $53_2$ is used to generate an interference pattern which is indicative of an orientation of the Fizeau surface 35 relative to the incident beam 33 of measuring light. The orientation of the Fizeau surface 35 is adjusted in dependence of an analysis of this interference pattern.

A hologram C provided on the first substrate $51_1$ and a hologram C provided on the second substrate $51_2$ are configured such that measuring light successively diffracted by the hologram C of substrate $51_1$ and the hologram C of substrate $51_2$ is substantially orthogonally incident on the surface 13 of the optical element 11. An interference pattern generated from the measuring light reflected from the optical surface 13 is indicative of the shape of the optical surface 13. The shape of the optical surface 13 can be processed in dependence of an analysis of the interference pattern generated from the light reflected from the optical surface 13 and successively diffracted by the gratings C provided on the substrates $51_1$ and $51_2$.

The gratings C on the substrates $51_1$ and $51_2$ are further configured such that an angle of the measuring light incident on the surface 13 scales linearly with a distance of the corresponding beams from a central axis 17. This is known as the sinus condition. With such configuration, the interferogram generated from the light reflected from the optical surface 13 represents a substantially undistorted image of the optical surface 13. With this configuration the image of the optical surface 13 is the same as the image by the use of an aplanatic transmission sphere, which is generally used in interferometry.

Figure 18:
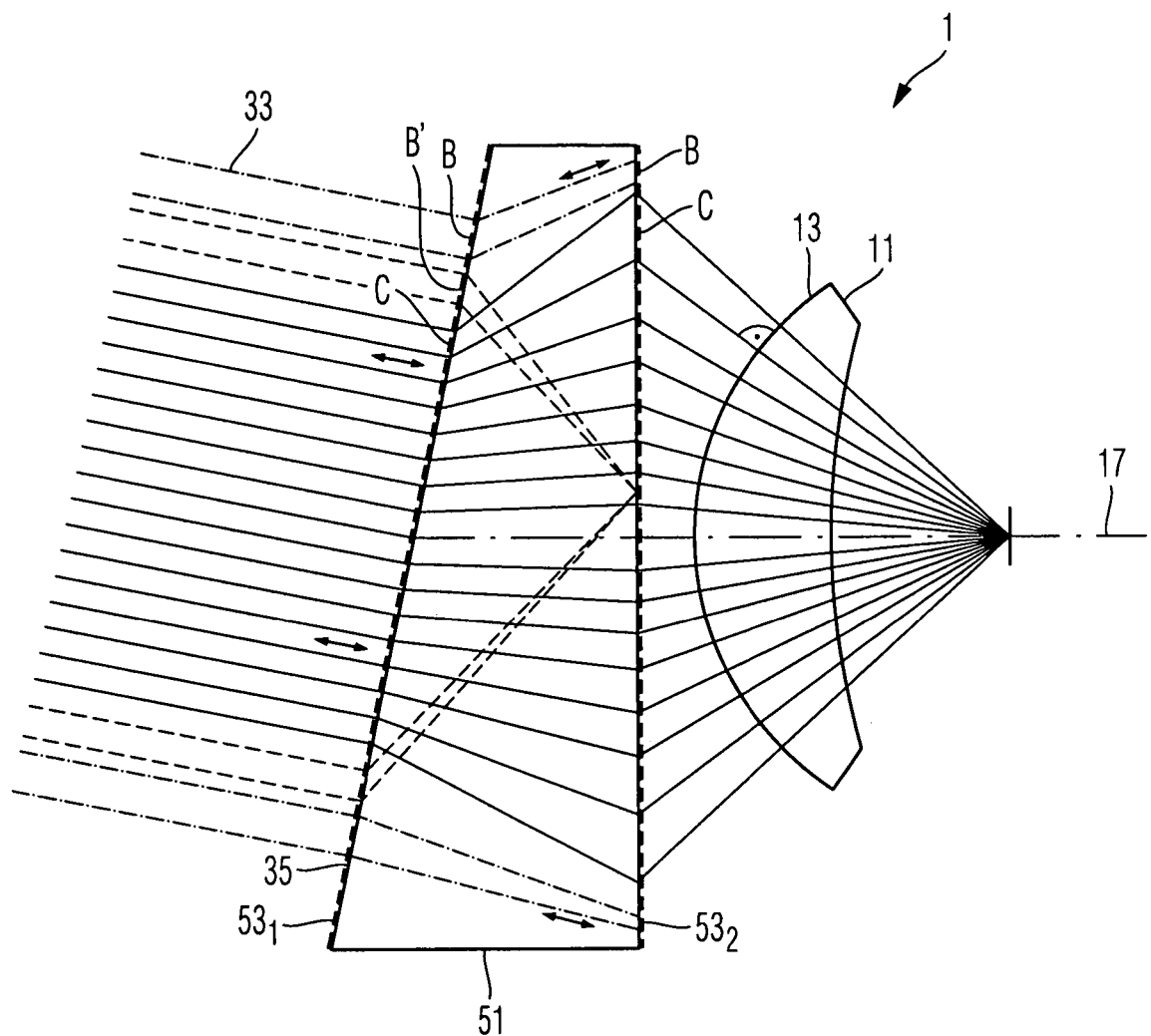
FIG. 18 illustrates a further interferometer arrangement used for testing an optical surface.

FIG. 18 illustrates a portion of an interferometer arrangement 1 for testing an optical surface 13 of an optical element 11. A configuration of the arrangement shown in FIG. 18 is similar to that shown in FIG. 17. However, surfaces $53_1$ and $53_2$ carrying holograms are provided on a same substrate 51, rather than two separate substrates, and a Fizeau surface 35 is provided by surface $53_1$ of the substrate 51 rather than by a separate substrate.

In the above illustrated embodiments, the plural holograms are provided as fixed holograms on a surface of a substrate. It is, however, also possible to provide the respective holograms by a light optical modulator having a plurality of light valves such as liquid crystal cells arranged in a pixel pattern, such as an array. By selectively switching the individual pixels to a light transmissive or non-transmissive state it is possible to generate a pattern which has a desired diffractive effect on the incident light. Further, a light optical modulator can be also provided by an array of switchable mirrors.

The holograms illustrated above may diffract the incident light in a first, second or higher diffraction order for forming the illustrated beams of measuring light incident on the respective lens surfaces. Further, the beams used for generating the interference patterns may be diffracted beams which are reflected from the hologram or transmitted through the hologram. The hologram may be provided as a phase grating or an amplitude grating.

In the above illustrated embodiments, the plural holograms are provided within separate regions of the surface of the hologram carrier. It is, however, also possible that for instance two holograms are provided within a same region of the hologram carrier wherein the two holograms are provided by alternating sub-regions having a width of about 10 µm to 1 mm.

In the above illustrated embodiments, the measuring light incident on the holograms is measuring light shaped as a parallel beam having substantially flat wave fronts. It is, however, also possible to shape the incident measuring light such that it is a convergent or divergent beam having spherical or aspherical wavefronts.

The shapes of the optical surfaces to be tested can be either spherical or aspherical. For a spherical surface the above embodiments are an alternative method to the use of a transmission sphere. One advantage is that drifts can be in situ measured and numerically or physically compensated. An aspherical surface, as used herein, intentionally deviates from a spherical shape within a measuring accuracy of the interferometer arrangement used for performing the test.

The measuring light used for performing the inteferometric tests illustrated above can be monochromatic measuring light or measuring light of plural different wavelengths.

An embodiment of a method of positioning optical elements relative to each other uses an interferometer apparatus comprising a plurality of holograms generating beams of adjustment measuring light which are incident on optical surfaces of the optical elements. Interference patterns generated by superimposing adjustment measuring light of the beams reflected from the surfaces are indicative of positioning errors of the optical elements. The beams of adjustment measuring light may comprise focused beams forming a point focus on the optical surface and beams of light which is orthogonally incident on extended portions on the optical surface.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A null lens arrangement for an interferometer for testing an optical element, the null lens arrangement comprising:
   a first grating configured to diffract measuring light such that measuring light diffracted by the first grating is substantially orthogonally incident on a first optical surface of the optical element in an extended region thereof such that a shape of the first optical surface within the extended region can be determined; and
   a second grating configured to diffract measuring light such that measuring light diffracted by the second grating is directed on a second surface such that a distance of the second surface from second grating can be determined.

2. The null lens arrangement according to claim 1, wherein the second surface is a surface of the optical element.

3. The null lens arrangement according to claim 1, wherein the second surface coincides with the first surface of the optical element.

4. An interferometer system for testing an optical element, the interferometer system having a null lens arrangement, wherein the null lens arrangement comprises:
   a first grating configured to diffract measuring light such that measuring light diffracted by the first grating is substantially orthogonally incident on a first optical surface of the optical element in an extended region thereof such that a shape of the first optical surface within the extended region can be determined; and
   a second grating configured to diffract measuring light such that measuring light diffracted by the second grating is directed on a second surface such that a distance of the second surface from second grating can be determined.

5. A method of manufacturing an optical element, the method comprising:
   mounting the optical element relative to a null lens arrangement of an interferometer;
   diffracting measuring light at a first grating of the null lens arrangement to form a first beam of measuring light which is substantially orthogonally incident on a first optical surface of the optical element;
   diffracting measuring light at a second grating of the null lens arrangement to form a second beam of measuring light directed on a second surface;
   superimposing light of the first beam of measuring light reflected from the first surface with reference light to generate at least one first interference pattern;
   superimposing light of the second beam of measuring light reflected from the second surface with reference light to generate at least one second interference pattern; and
   processing the first optical surface based on the at least one first interference pattern and the at least one second interference pattern.

6. A method of operating an optical system, the method comprising:
   mounting the optical element relative to a null lens arrangement of an interferometer;
   diffracting measuring light at a first grating of the null lens arrangement to form a first beam of measuring light which is substantially orthogonally incident on a first optical surface of the optical element;
   diffracting measuring light at a second grating of the null lens arrangement to form a second beam of measuring light directed on a second surface;
   superimposing light of the first beam of measuring light reflected from the first surface with reference light to generate at least one first interference pattern;
   superimposing light of the second beam of measuring light reflected from the second surface with reference light to generate at least one second interference pattern; and
   adjusting a position of the first optical surface relative to the second optical surface based on the at least one first interference pattern and the at least one second interference pattern.

* * * * *